(12) United States Patent
Grant et al.

(10) Patent No.: US 9,459,621 B2
(45) Date of Patent: Oct. 4, 2016

(54) TRACKLESS VEHICLE AND SYSTEM FOR SYNCHRONOUS CONTROL OF TRACKLESS VEHICLE

(71) Applicant: Oceaneering International, Inc., Houston, TX (US)

(72) Inventors: Andrew Scott Grant, Winter Garden, FL (US); Michael Wayne Boshears, Orlando, FL (US)

(73) Assignee: OCEANEERING INTERNATIONAL, INC., Houston, TX (US)

( * ) Notice: Subject to any disclaimer, the term of this patent is extended or adjusted under 35 U.S.C. 154(b) by 144 days.

(21) Appl. No.: 14/211,500

(22) Filed: Mar. 14, 2014

(65) Prior Publication Data
US 2014/0277849 A1 Sep. 18, 2014

Related U.S. Application Data

(60) Provisional application No. 61/800,257, filed on Mar. 15, 2013.

(51) Int. Cl.
*G05D 1/00* (2006.01)
*A63G 31/00* (2006.01)
*G05D 1/02* (2006.01)

(52) U.S. Cl.
CPC .............. *G05D 1/0027* (2013.01); *A63G 31/00* (2013.01); *G05D 1/0297* (2013.01); *G05D 2201/0212* (2013.01)

(58) Field of Classification Search
None
See application file for complete search history.

(56) References Cited

U.S. PATENT DOCUMENTS

| | | | | |
|---|---|---|---|---|
| 3,361,082 A | * | 1/1968 | Leslie | A63H 19/24 104/297 |
| 5,583,844 A | * | 12/1996 | Wolf | A63G 31/16 701/1 |
| 5,623,878 A | * | 4/1997 | Baxter | A63G 1/30 472/43 |
| 6,122,571 A | * | 9/2000 | Gerstner | A63G 1/10 701/19 |
| 6,385,506 B1 | * | 5/2002 | Hasegawa | G05B 19/042 700/245 |
| 7,094,157 B2 | * | 8/2006 | Fromyer | A63G 31/12 472/130 |
| 2002/0068641 A1 | * | 6/2002 | Dicicco | A63G 31/16 472/60 |
| 2005/0048446 A1 | | 3/2005 | Fromyer et al. | |
| 2005/0055132 A1 | * | 3/2005 | Matsumoto | B25J 9/1682 700/245 |
| 2008/0188318 A1 | | 8/2008 | Piccionelli et al. | |
| 2010/0053029 A1 | | 3/2010 | Wilzbach et al. | |
| 2013/0012328 A1 | | 1/2013 | Stoker | |

FOREIGN PATENT DOCUMENTS

WO 2012155120 A1 11/2012

* cited by examiner

*Primary Examiner* — Rami Khatib
*Assistant Examiner* — David Merlino
(74) *Attorney, Agent, or Firm* — Dentons US LLP

(57) ABSTRACT

A system to transport a payload platform along a predefined path in an amusement facility, including a system controller to generate and transmit a timing signal and a propulsion platform, coupled to and supporting the payload platform, to traverse the predefined path in synchronism with the timing signal received from the system controller. The propulsion platform having an address corresponding to at least one of a plurality of individually addressed timing signals. The system may further include a plurality of entertainment devices positioned along the predefined path in an amusement facility, that likewise operate in synchronism with the timing signal received from the system controller.

23 Claims, 4 Drawing Sheets

TRACKLESS VEHICLE AND SYSTEM FOR SYNCHRONOUS CONTROL OF TRACKLESS VEHICLE

This application claims the benefit of U.S. Provisional Patent Application No. 61/800,257, filed on Mar. 15, 2013, which is hereby incorporated by reference as if fully set forth herein.

FIELD

The present disclosure relates to propulsion platforms and ride control systems used by trackless vehicles in, for example, amusement facilities. More specifically, the present disclosure relates to self-powered, self-guided, propulsion platforms configured to transport multiple types of payloads along a predefined path in a facility, groups of such platforms, and synchronous operation of such groups under different operating schemes.

BACKGROUND

Amusement rides can, and often do, include one or more carriages that are used to transport patrons through an enclosed (i.e., indoor) space, through an outdoor space, or through a combination of indoor and outdoor spaces. Tracks, embedded in or bolted to the surface traversed by the carriage, have been used to guide carriages through rides both indoors and outdoors.

While not typically thought of this way, an amusement ride is designed to tell a story in addition to entertain or thrill. The story is presented to the patron in the form of a show consisting of a plurality of individual scenes. The show might immerse the patron in an adventure or provide the patron with information. The show's storyline is typically advanced by moving the patron in a car past a series of fixed scenes (e.g., locations within the ride). At each location, the patron may be presented with a three-dimensional set depicting a scene in the story. The set might include moving and non-moving components; however, the set itself is typically fixed at one location. In a typical amusement ride, because the patrons are moving through the ride, past each set, the sets are not changed after each patron views the set. Instead, if some action is performed in a given first set, the ride is timed such that a given patron, in a given car, is within view of the first set from the start of its action to the conclusion of its action. At the conclusion of the action, the patron is transported to the next set. A new patron is simultaneously transported to within view of the first set and the process is repeated again and again for each subsequent patron.

The movement of patrons past fixed sets is the expected norm of today's typical amusement rides. In such conventional rides, patrons are moved between rooms in cars. Each room can include one or more fixed location sets (or scenes). Additionally or alternatively, patrons are moved from one set to the next within a common room. In a common room situation, patrons are typically moved toward one set after another. Also, in a common room situation, a patron in one car can see, if only briefly, other patrons in other cars moving from set to set.

These methods of advancing a storyline are limiting in that each set is fixed to a certain location (even though the set itself might include moving features). Synchronization between cars and sets is not present or is limited to a macro level. For example, tracked system (and some trackless systems) may not run the sets continuously, but rather are triggered by the proximity of the cars to "event synchronize" the set. That is the set operates once the car arrives at some point, but this is not complete synchronization of the car and set. However, a time-based synchronization between a car's exact position/motion and a specific motion of a set associated with the car's exact position/motion is non-existent. Moreover, these methods are dated and not exciting because patrons have come to expect to be seated in cars and driven from room to room or set to set as part of a typical amusement ride.

U.S. Published Patent Application No. 2010/0053029, published Mar. 4, 2010 (the '029 publication), describes an amusement ride where patrons are not passed from room to room, rather, a room is divided into zones by use of mobile/moving platforms equipped with display devices. The display devices are configured to present video images to patrons in other mobile/moving platforms. The display devices could be televisions, liquid crystal displays (LCDs), plasma displays, or a system consisting of a video projector and projection screen. The '029 publication's display devices in general, and their screens in particular, are means of presenting two-dimensional images to a patron for the patron's entertainment. Two-dimensional images, however, deprive patrons of a sense of reality or realistic comic fiction that is desired by patrons.

Similarly, the '029 publication's display devices are utilitarian machines; they occupy space but do not add to the excitement of a show; they are not a "part of the show" in that they do not, alone, entertain a patron. The entertainment is provided by the two dimensional image presented on the screen of the display device.

Because the display devices are three-dimensional objects that are not a part of the show, the physical structures that form the display devices (e.g., the housing surrounding the device and the bezel around the edges of the screens of televisions, liquid crystal displays, plasma displays, and projection screens) must be disguised. Even so, patrons realize that the entertainment being provided to them is simply a two-dimensional image presented on a screen. This is true regardless of whether the screen is flat or includes simple or complex contours. This realization diminishes the enjoyment of the show.

Furthermore, the screens of the display devices destroy the illusion of infinity or depth of view, because the two dimensional image projected on the screen must necessarily have a border that is visible to the patron. Even if the borders (or bezels) of the panels forming the screens are reduced to millimeter widths, two dimensional projected images necessarily end at the edges of their screens.

Further, the size of many display devices, including those described in the '029 publication, is a disadvantage. The size limits the sightlines of patrons. The '029 publication, however, exploits this disadvantage by using groups of display devices on adjacent propulsion platforms to create temporary movable or moving walls. The walls define zones within the ride.

According to the '029 publication, a first group of patrons in a first zone can watch a first two-dimensional projection, while a second group of patrons in a second zone (blocked from view of other groups of patrons by a wall of at least one of the display devices) watches a second two-dimensional projection. As the two-dimensional projections in each zone end, the propulsion platforms of the various groups of display devices move to positions that allow the first group of patrons to pass into the second zone and the second group of patrons to pass into a third zone. The propulsion platforms of the various groups of display devices then return to their previous positions to block the sightline of one group from another.

Although the '029 publication's method produces moving and/or movable configurations of walls, it robs patrons of a sense of realism that can only be provided by the physical presence of a three-dimensional object modeled to represent a piece of the real (or fantasy) world. For example, a two-dimensional image of an elephant lunging toward a patron is hardly as entertaining as a three-dimensional animated model of an elephant lunging toward the patron from a fixed set in a conventional ride. Entertainment presented in three dimensions (by objects that occupy three dimensions of space) is desirable.

By contrast, in the example given above, the three-dimensional animated elephant that lunges from a fixed set seems real. It is physically present; it displaces space in the vicinity of the patron and physically reaches out to the patron.

Amusement parks include multiple amusement rides, as well as stores, restaurants, and entertainment venues located within the park. The rides, stores, etc. are typically placed adjacent to streets or paths along which patrons stroll through the amusement park. Parades are often conducted on these streets or paths during park operational hours. The parades typically include a series of live action performers walking along the parade route and a series of parade floats supporting live action performers and/or animated figures. The parade floats can be manually pulled and/or self-propelled, but are typically steered by a human operator. When the park has no patrons, maintenance vehicles can be pulled, towed, or driven on the same streets or paths.

The use of automated guided vehicles (AGVs) in amusement parks is growing in popularity. It is believed that AGVs first found utility in warehouses, where they continue to be used to transport goods between locations of the warehouse. AGVs also find utility in large office buildings, where they might be used to deliver mail or packages. In each of these exemplary AGV environments, collision avoidance is typically provided in one or more of the following ways.

According to a first method, the environment, say a warehouse is divided into multiple non-overlapping zones. An AGV is forbidden to enter a given zone if another AGV is already present in that zone. When the AGV approaches or enters a forbidden zone, an event alerts the AGV control systems and any master monitoring systems of the event and takes corrective action. Synchronization of AGV actions are typically event driven.

In a second method, the AGV surrounds itself with a virtual detection field, which may change dynamically as the AGV's speed and direction change. The virtual detection field could be implemented using, for example, one or more of radio waves (radar), light waves (lidar), optics (object detection systems), or sound waves (sonar). As an AGV approaches an obstacle, such as a wall or shelving unit, the on-board detection field detects the presence of the obstacle and may cause the AGV to, for example, stop until the field is clear. Again, this is an event which drives the AGV to take corrective action.

In warehouses, and even office buildings, AGVs can announce their presence using both audible and visual safety systems, such as a beeping horn and a blinking light. In amusement parks, however, the use of beeping horns and blinking lights on an AGV would ruin any illusion of fantasy. Furthermore, amusement parks are filled with distractions by design. The distractions appeal to all ages of patrons. Children, and even adults, are apt to carelessly walk into objects or people. In many venues, outdoor parade routes are carefully secured prior to allowing the parade vehicles to enter the route. Still, accidents happen and a distracted or disabled person, unaware of any danger, might walk into the path of a vehicle.

If a human is physically steering and controlling the speed of a vehicle, the human is hopefully able to avoid causing the patron injury. However, AGVs used in an amusement park or an amusement park ride will typically be programmed to make an "emergency stop" in the event that an object is suddenly detected in the path of the AGV, or if a fault is detected in the AGV. In an emergency stop condition, propulsion stops and brakes are forcefully applied to bring the AGV to a stop as soon as possible. The forceful application of the brakes, however, may cause the AGV to skid. Such emergency stops cause the AGV to lose synchronization with its environment and require that the amusement ride or parade be reset and either restart from the beginning or from some fixed start point. That is, such emergency stops interrupt the flow of the show, which often cannot restarted seamlessly, and if it can be restarted, some portion of the show will likely be missed.

What is needed is a system and method that can solve one or more of the problems associated with the prior art as explained above.

SUMMARY

What is needed is a system that includes a plurality of self-powered, self-guided trackless propulsion platforms that maintain synchronization with their environment and amongst the plurality of platforms. One or more platforms may include a passenger cabin mounted atop a motion base. Alternatively, a passenger cabin may be directly mounted to the propulsion platform. In combination with or separately, one or more platforms may transport three-dimensional show scenery and/or animated figures or animated representations of equipment throughout a ride.

Additionally, what is needed is a ride control system that maintains synchronization of the plurality of trackless propulsion platforms with each other, with other movable action components of a show, and with the multimedia presentations that may be a part of the show. In a preferred embodiment, synchronization could be maintained by transmission of a plurality of addressed timing signals, where each addressed timing signal is decoded and used by only one platform having the address corresponding to the addressed timing signal.

Additionally, what is needed is a method to control the synchronized deceleration and stopping of the plurality of platforms in an emergency situation by quickly bringing the platforms to a stop without any skidding, while maintaining synchronization between the platforms, devices performing action in the show, and multimedia programming that is synchronized to the locations of a given platform during the show.

Accordingly, the present invention is directed to a system, device, and method for trackless vehicles to permit the safe simultaneous operation of a group of vehicles in close proximity, where each one of the group of vehicles is propelled in speed and direction according to a pre-stored route but all vehicles in the group are synchronized to a remotely generated variable frequency timing signal or are internally synchronized based off of a master time signal and a series of commands, that substantially obviates one or more of the problems due to limitations and disadvantages of the related art. By way of non-limiting examples, the vehicles may be ride vehicles or vehicles in a parade.

The objectives and advantages of the present invention may be achieved through a system to transport one of a plurality of payloads along a predefined path in an amusement facility. The system might include a system controller configured to generate and wirelessly broadcast a plurality of timing signals, a propulsion platform, coupled to and supporting the payload platform, configured to traverse the predefined path in synchronism with at least one of the timing signals, the propulsion platform having an attachment point to which one payload platform of the plurality of payloads could removably attach. The payload platform might include a plurality of seats, support at least one live action performer, support at least one animated three-dimensional figure, support at least one three-dimensional representation of scenery, or support a three-dimensional representation of mechanical equipment.

The objectives and advantages of the present invention may be achieved through a system, including a system controller configured to generate and wirelessly broadcast a plurality of individually addressed timing signals, a plurality of propulsion platforms, each propulsion platform having an address corresponding to at least one of the individually addressed timing signals, wherein each propulsion platform is configured to move in synchronism with its corresponding one of the at least one individually addressed timing signals.

The objectives and advantages of the present invention may be achieved through a ride control system that could include a transmitter, a first processor operationally coupled to the transmitter, a first memory operationally coupled to the first processor, the first memory storing instructions that when executed by the processor cause the ride control system to transmit individually addressed timing signals. The system might further include a plurality of propulsion platforms, each platform having at least three wheels, at least a first of the three wheels configured to support the platform and propel the platform across a surface, a motor coupled the first of the three wheels, a receiver, a second processor operationally coupled to the receiver and motor, a second memory operationally coupled to the second processor, the second memory storing instructions that when sequentially executed by the second processor cause the motor to sequentially step the wheel by a predefined rotational increment in synchronism with a timing signal received from the ride control system.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION

Reference will now be made in detail to the exemplary embodiments of the present invention, which are illustrated in the accompanying drawings.

As used herein, the term amusement facility encompasses both amusement rides that are track-free and wire-in-ground free and entire amusement parks that include multiple amusement rides with streets and paths between rides. A system of the type described and claimed herein does not require tracks or wire-in-ground fixed paths for navigation.

Figure 1:
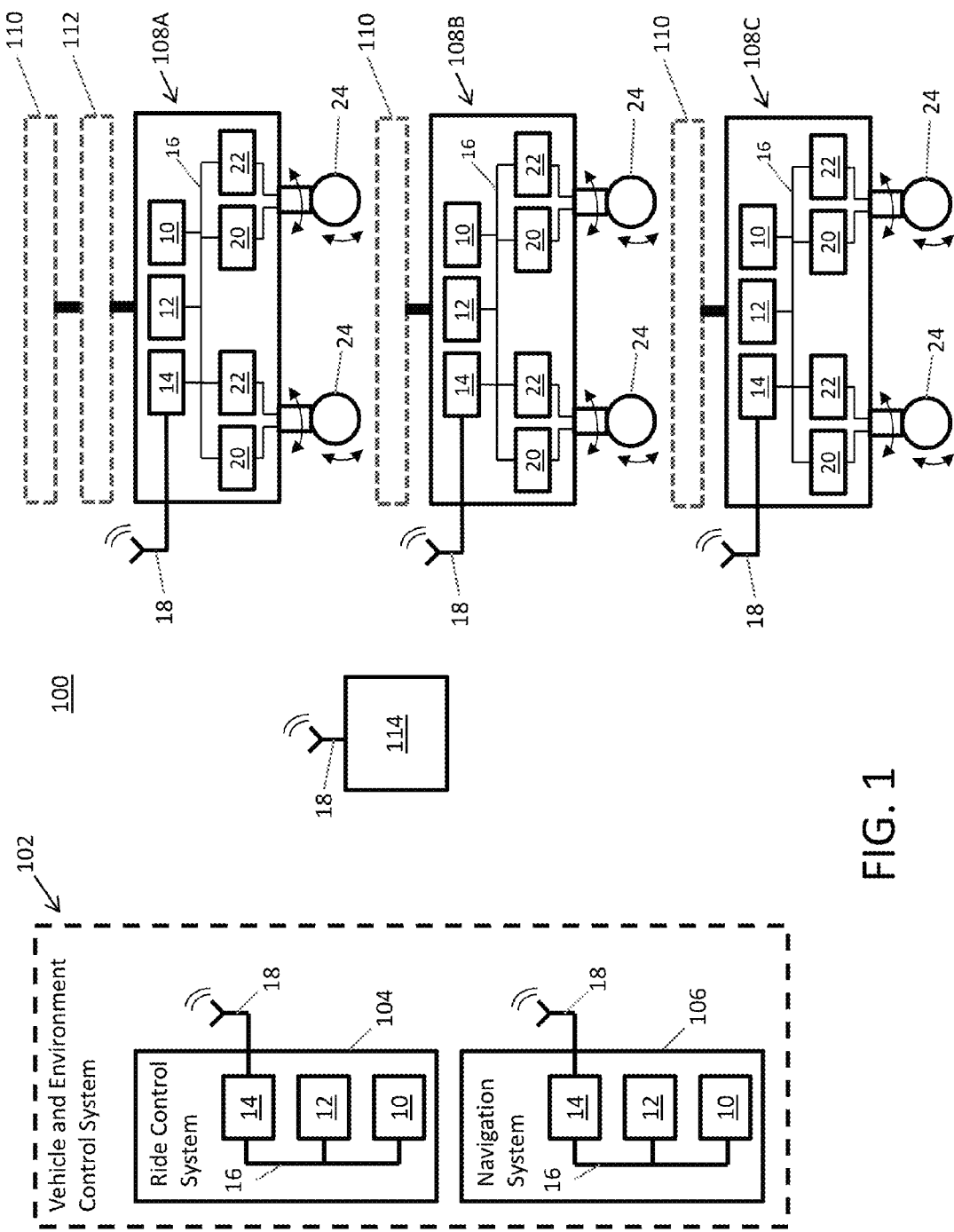
FIG. 1 is a block diagram of a system in accordance with an embodiment of the invention.

FIG. 1 is a block diagram of a system in accordance with an embodiment of the invention. According to FIG. 1, the system 100 includes a control system 102. The control system 102 may be comprised of subsystems, including a ride control subsystem 104 and a navigation subsystem 106. Each subsystem may include a memory 10, a processor 12, and an input/output (I/O) device 14, all operationally coupled via a communications bus 16. The I/O device 14 may be operationally coupled to an antenna or other wireless transmission/reception device 18 (such as an infrared transceiver). Memories 10, processors 12, I/O devices 14, communications busses 16, antennas 18, and their operational couplings are all well known and understood in the art.

According to FIG. 1, the system 100 further comprises a plurality of automated trackless vehicles 108A, 108B, 108C (individually or collectively referred to as "propulsion platform 108" or "propulsion platforms 108", respectively). Each of the plurality of propulsion platforms 108 may support any one of a plurality of payload platforms 110.

Payload platforms 110 may take on various forms and functions. The common use of reference number 110 in FIG. 1 is therefore not meant to imply that all propulsion platforms 108 in a given system 100 are limited to identical types of payload platforms.

Payload platforms 110 can include passenger cabins, show scenery, animated figures, and/or animated representations of equipment or any combination thereof. In addition, any one or more of the payload platforms 110 can be coupled to its corresponding propulsion platform 108 via a "motion base" 112, although in a non-limiting example, only propulsion platform 108A of FIG. 1 illustrates the motion base 112. A motion base 112 can be used to move the payload platform 110 with respect to the propulsion platform 108, for example, by changing the payload platform's 110 orientation relative to the orientation of the propulsion platform 108 in one or any combination of yaw, roll, pitch, and heave. The propulsion platforms 108 themselves may be capable of changing their orientation and consequently the orientation of the coupled payload platform 110 (with or without a motion base) with respect to the surface the propulsion platform 108 is traveling on in one or any combination of yaw, sway, and surge. Together, the propulsion platform 108 and the motion base 112 allow the payload platform (e.g., a patron within a passenger cabin) to experience six degrees of motion freedom (6DOF) in addition to propulsion. In another embodiment, the motion base 112 may be utilized to move the payload platform 110 in 6DOF, with the propulsion platform 108 used only to propel the payload platform 110 along a path. And in yet another embodiment, the propulsion platform 108 may alone move the payload platform 110 in 6DOF as well as propel the platform along a path, without the need for a motion base. A detailed description of one embodiment of a propulsion platform, motion base, and passenger cabin, their couplings and movements relative to one another may be found in U.S. patent application Ser. No. 13/470,244, filed May 11, 2012, which is incorporated by reference herein.

In addition to controlling and ensuring the synchronization of the plurality of propulsion platforms 108, whether used within an indoor ride or in an outdoor parade, the ride control system 104 can control and synchronize the overall operation of an entire show. For example, the ride control system 104 can control the operation of multiple motors, actuators, lights, audio, and video generating devices that could be on a given load platform 110 or present in fixed locations within the amusement facility. For ease of illustration, these various entertainment devices are represented by a single box given reference number 114. Antenna 18, operationally coupled to any device 114 may facilitate wireless communication between the ride control system 104 and the device 114.

The navigation system 106 could be configured to monitor and compare the known position of a propulsion platform 108 to its expected position. If the error between known and expected positions becomes too large, the navigation system 106 could alert the ride control system 104 of a fault. However, this is not the only type of fault that can be reported to the ride control system 104.

The ride control system 104 may provide a secondary or backup level of safety. For example, the ride control system 104 could monitor and compare the known position of a propulsion platform 108 to its expected position; but the comparison and/or determination of the known and expected positions of the propulsion platform 108 might be accomplished using different algorithms or methods than those used by the ride control system 106.

In one embodiment, the actual position (in, for example, an XY coordinate system mapped to the floor of a ride) of the wheel of a propulsion platform is periodically compared (preferably at a constant frequency such as, for example, 30 times per second) to the expected position of the wheel. The expected position of the wheel is based on the number of movement instructions executed since the start of the ride. In the embodiments described herein, this is possible because the expected position of a wheel is not based on time elapsed from the start of the ride. Instead, it is based on the summation of all wheel movement instructions executed up to a given moment in time. The wheel movement instructions are executed based on a virtual clock, referred to herein as a "show time clock". In embodiments of the present invention, the frequency of the show time clock can be varied, and even reduced to zero. Positive and negative limits as to the rate of change of the frequency of the show time clock must be maintained. If the positive rate of change of the frequency is too great, then the wheel of the propulsion platform that is synchronized to the show time clock will spin in place. If the negative rate of change of the frequency is too great, the wheel of the propulsion platform that is synchronized to the show time clock will skid. Limits are also imposed on the rate of change of the frequency of the show time clock due to the maximum rate of change of the velocity of the drivers associated with the motors of the wheels. The minimum and maximum rates of change are driven by the dynamics of the system in which this invention is deployed and therefor are specific to that system.

Although described as separate subsystems, ride control subsystem 104 and navigation subsystem 106 could be implemented as one system. If implemented as one system, duplication of processors 10, memories 12, and I/O devices 14, and antennas 18 might be reduced.

Each propulsion platform 108 may include at least one propulsion driver/motor 20, at least one steering driver/motor 22, where the at least one propulsion driver/motor 20 and at least one steering driver/motor 22 are coupled to at least one driven and/or steered wheel 24. Each propulsion platform 108 may furthermore include a memory 10, a processor 12, and an input/output (I/O) device 14, all operationally coupled via a communications bus 16. The I/O device 14 may be operationally coupled to an antenna or other wireless transmission/reception device 18 (such as an infrared transceiver). Memories 10, processors 12, I/O devices 14, communications busses 16, antennas 18, propulsion driver/motors 20, steering driver/motors 22, and their operational couplings are all well known and understood in the art.

For commonality and to reduce down-time for maintenance, each propulsion platform 108 may have at least one attachment point to which one payload platform 110 of the plurality of payload platforms 110, or one motion base 112, could be fixedly or removably attached.

As indicated above, the payload platforms 110 could be configured for various purposes. In one embodiment a propulsion platform 108 that solves one or more of the above-mentioned problems can be configured to permanently or interchangeably receive and support: a passenger cabin (open or closed) including a plurality of seats, a stage for a live action performer (for example for use in a parade), a fixed scenery set, a mechanically dynamic scenery set, animated figures, show action equipment, or any combination of these or other physically present three-dimensional forms of entertainment.

Returning to the ride control subsystem 104, the ride control subsystem 104 can be configured to wirelessly broadcast to, and/or communicate with, each of the plurality of propulsion platforms 108. Each of the plurality of propulsion platforms 108 can be provided with a unique address to facilitate communication between any one propulsion platform 108 and the ride control system 104. In some embodiments, multicast and unicast communication between the ride control system 104 and propulsion platforms 108 may be implemented. In another embodiment, one of the propulsion platforms, for example 108A may include the ride control subsystem 104 or other circuitry that allows the propulsion platform 108A to control the other platforms of the plurality of propulsion platforms 108. That is, the plurality of propulsion platforms may be organized in a master/slave configuration, in which the master propulsion unit, for example 108A, comprises the ride control system 104 and the other propulsion platforms are synchronized to the master propulsion platform.

The ride control subsystem 104, regardless of its location, can be configured to generate individually addressed show timing signals to individual propulsion platforms 108 by virtue of the addressability of its communications with the individual propulsion platforms 108. In one embodiment, the show timing signals are broadcasted variable show time clocks that are used to synchronize the position of the wheels of a propulsion platform on an XY coordinate system mapped to the floor of a ride or the streets of an amusement park, as well as the audio, video, motion, etc. of the entire ride/parade system environment. However, these show timing signals are unlike conventional clock signals in that the show timing signals can vary, whereas conventional clock signals strive to precisely maintain a single frequency. In another embodiment, the show timing signals are data packets which communicate an exact time from a master clock so that the propulsion platform 108 processors 10 can generate a show time clock locally synchronized to the master clock. In this embodiment, the data packets may also include instructions for modification of the locally generated show time clock (e.g., reduce the show time clock to zero). If such a command is received, the local show time clock can then be reduced to zero.

In the broadcasted variable show time clock embodiment, the vehicle and environmental control system 102 and each of the plurality of propulsion platforms 108 and entertainment devices 114 would be considered "synchronous" systems. That is, if either a propulsion platform 108 or entertainment devices 114 missed one or more clock pulses from the ride control system 104, these devices may still remain synced but would be in a delayed sync with other platforms 108 or devices 114 that did not miss one or more clock pulses.

Whereas, in the data packet embodiment, this same system of platforms 108 and devices 114 would be considered asynchronous and a missed data packet from the ride control system 104 (assuming that the time between communication of subsequent data packets is sufficient small) would not necessarily cause a delayed synchronization.

Movement of a propulsion platform 108 can be achieved, according to one embodiment as follows. Each propulsion platform 108 includes a memory 12 storing one or more sets of predetermined instructions. When executed by a processor 10 of the propulsion platform 108, the instructions cause drivers to drive propulsion and/or steering motors of the wheels of the propulsion platform 108. Each memory may also contain one or more sets of data that represent, in part, finely spaced-apart points on an XY coordinate system, where the entirety of the finely spaced-apart points trace out a predetermined path of travel for a given wheel of the propulsion platform 108 on the XY coordinate system.

In one embodiment, the instructions sequentially execute movements of the wheels of the propulsion platform 108 according to the stored data. For example, data might represent absolute or relative coordinates on an XY plane. The XY plane could be mapped to the floor of an indoor or outdoor attraction, or it could be mapped to points on a road along a parade route at a theme park.

To get from a current XY coordinate to the next XY coordinate, the data input sequentially to the instructions might represent a change to the directional pointing angle of the wheel relative to its current pointing angle, and might also represent a number of degrees of rotation of the wheel along the ground. Upon execution of the instruction, the wheel will turn to steer itself toward the specified pointing angle and rotate by the specified number of degrees. When the instructions are executed sequentially, the wheels of the propulsion platform 108 move in a stepped fashion. Because the steps occur so rapidly in sequence, it appears to a patron that the rotation and steering of the platform is being continuously adjusted. In fact, the step by step motions of the wheels cause the platform to move along a predefined path at predetermined velocities with predetermined accelerations. Because the data is implemented in sequence, it is possible to know, with a predetermined accuracy, where each wheel of each propulsion platform 108 is on the XY coordinate system at any given moment during the show. The above method is not only applicable to the XY position of the propulsion platforms, but also to the audio, video, motion, etc. of the ride/parade vehicles and to the environment in which they operate.

Figure 2:
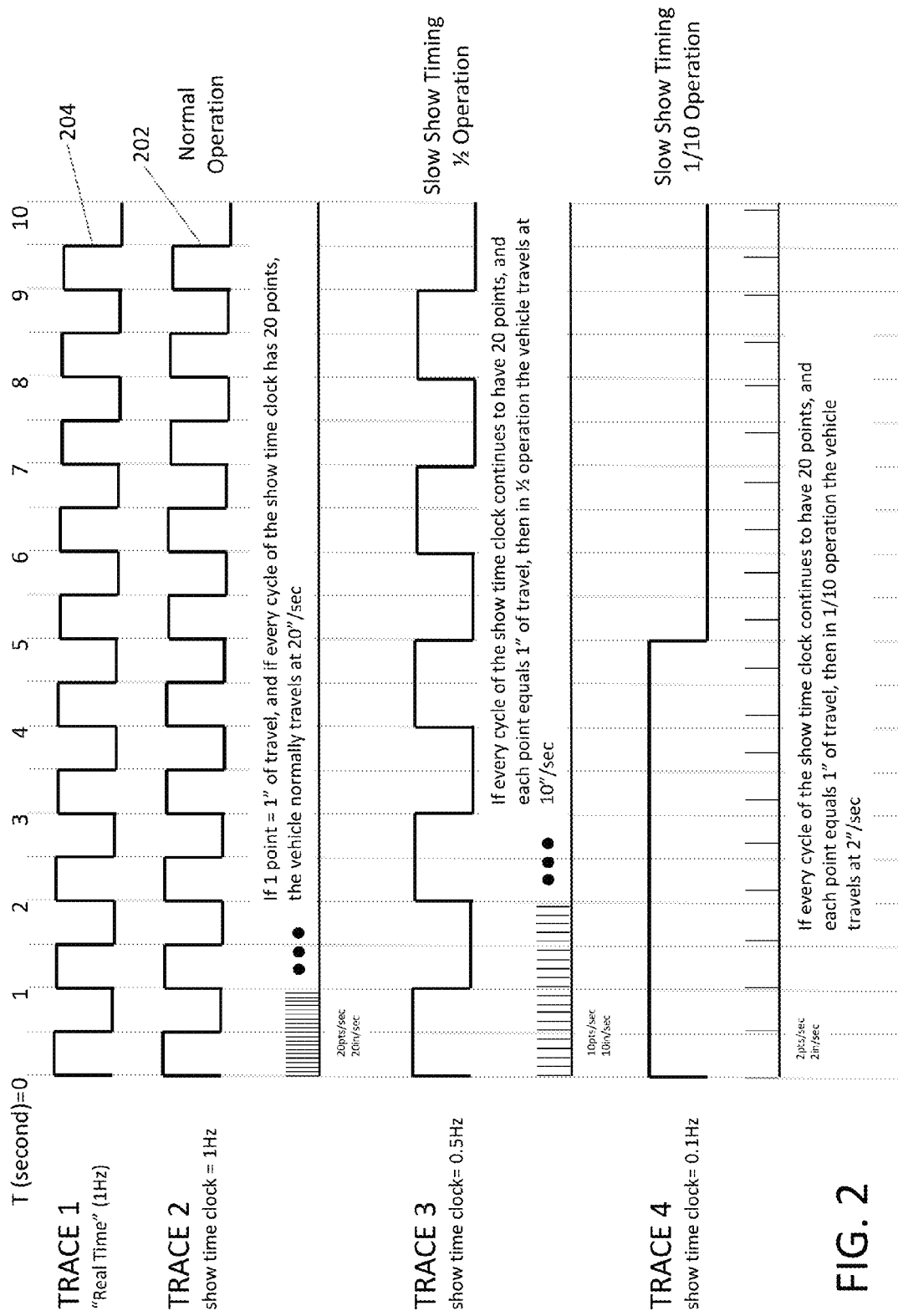
FIG. 2 is a timing diagram to illustrate a relationship between a show time clock and real time in accordance with an embodiment of the invention.

FIG. 2 is a timing diagram to illustrate a relationship between a show time clock and real time 204 in accordance with an embodiment of the invention. As detailed above, the show time clock may be broadcast from the ride control system 104 or may be decoded from data packets send by the ride control system 104 and then locally generated in each propulsion platform 108 and entertainment device 114.

Trace 1 represents a "real time clock signal" 204. Trace 1 is only presented for purposes of comparison. A propulsion platform 108 according to the embodiments described herein is not required to receive a "real time clock signal" for navigation. For purposes of illustration only, the "real time clock signal" 204 is shown as having a 1 Hz frequency. Accordingly, each rising edge of the "real time clock signal" 204 represents the passage of one second. FIG. 2 represents the passage of 10 seconds of time.

Trace 2 represents a show time clock 202 decoded by a given processor 10 of a given propulsion platform 108. In this example, when the system 100 is operating according to "normal operation" the frequency of the show time clock 202 is equal to the frequency of the real time clock signal 204. In other words, the propulsion platform moves through a ride, executes turns and speed changes, according to the nominal creative design parameters of the ride. Again, it must be noted that this example is presented for illustrative purposes only. There is no requirement for the show time clock 202 have the same frequency as the illustrative "real time" signal.

Trace 3 illustrates the execution of 20 movement instructions each second. Only the first second worth of data is illustrated. In the example, 20 short vertical marks each represent one of the 20 sequential instructions. Each sequential instruction may cause a change to a pointing angle of a wheel and may cause that wheel to rotate a given number of degrees. In the exemplary embodiment a rate of 20 instructions per second is used, however, this rate can be changed without departing from the scope of the invention.

For ease of illustration and explanation, it will be assumed that at T=0 a given wheel of the propulsion platform is located at a known location in a XY plane mapped to the floor of ride. During the time between T=0 and T=1, the platform is to move in a straight line at a constant velocity of 20 inches per second. In this simplistic example, assuming that 20 sets of data are executed per second, the data for each of the first 20 instructions will cause the propulsion wheel to maintain its present pointing direction and rotate a predetermined number of degrees along the floor. The rotation by the predetermined number of degrees will correspond to 1 inch of travel on the floor. Therefore, during normal operation, at this point in the show, between T=0 and T=1, the wheel of the propulsion platform is traveling at 20 inches per second across the floor.

With reference to FIG. 1, if, by way of example, the ride control system 104 determines that it is necessary to cause every one of the plurality of propulsion platforms 108 in the ride to come to an emergency stop, without losing synchronization to the multimedia presentation and without losing predetermined and known position on the floor, the ride control system can cause the frequency of the broadcasted or decoded show time clock addressed to each of the propulsion platforms 108 to decrease synchronously with one another and synchronously with the show timing signals addressed to every device 114 of the ride. The show time clock can be reduced to zero if necessary. This synchronized stop may be accurately referred as pausing the show.

There are any number of conditions (or "faults) that may lead to the pausing of the show other than a propulsion platform not being located where it is expected to be located. Such conditions may be created or customized by the operator of the show, however a few common conditions are that other parts of the show have malfunctioned and have not been reset or are slow in resetting, patron embarkation or debarkation are outside of normal parameters, or the propulsion platform identifies a maintenance need. Additional conditions include partitions between different sections of a show not opening or showing as not opened, a new vehicle is being introduced to the system, a propulsion platform signaling an internal fault such as overheating. Likewise, a human operator or observer can trigger a condition leading to pause because they recognize something out of the ordinary via a monitoring system or by visual. This listing of conditions which may lead to pausing of the show is exemplary only and should not be considered limiting to the disclosed invention.

Returning to FIG. 2, Trace 3 illustrates that if the frequency of all timing signals was reduced by fifty percent, the rotation of the exemplary wheel would be reduced from 20 inches per second to 10 inches per second. To further illustrate the benefit of synchronously reducing the speed of the entire ride, one might consider the animated trunk of an elephant as a device 114. Say, for example, that the drivers of the elephant's trunk were also operating at a normal rate of 20 instructions per second. Further, say that in the same time that the exemplary wheel was to normally drive past the elephant's trunk at 20 inches per second, the elephant's trunk was to be raised at a rate of 13 inches per second. Due to the benefit of synchronously reducing the frequency of the show timing signals of the wheel and the elephant's trunk, the wheel now passes the elephant's trunk at 10 inches per second, while the elephant's trunk is only raised at a rate of 6.5 inches per second. Furthermore, if the show time clock associated with a sound track of the noise of the elephant's trunk was also synchronously reduced with the show timing signals of the wheel and the elephant's trunk, only 50 percent of the sound normally heard in the real one second of time would be heard.

Trace 4 shows that if the frequency of the decoded timing signals for all platforms, pieces of show equipment, and multimedia of the show were further slowed to one tenth the normal operating frequency, the travel of the exemplary wheel would be reduced to only two inches of movement at a rate of 2 inches per second. The elephant's trunk would travel only 1.3 inches, and the soundtrack associated with the elephant's trunk would be slowed to only 10 percent of its normal value. In other words, the entire ride would slow to only one tenth of its normal speed as the ride control system synchronously reduced the frequency of all show timing signals from 1 Hz to 0.1 Hz. If the ride control system reduced the frequency of the show time clock to 0 Hz, all movement and multimedia would stop, but would in fact remain synchronized.

To the patron, even though real time in the real world continues (i.e., patrons may have to wait for several minutes while ride workers correct the fault that caused the ride control system to execute an emergency stop) the time in the imaginary world of the ride has slowed to a stop in a controlled manner.

The ability to synchronously decrease the speed of an entire ride, including the propulsion platforms in the ride, the entertainment devices 114 (on movable platforms and on fixed locations) within the ride, and the multimedia presentations played during the ride, is a great advance over the prior art; especially because synchronization, in one embodiment, can be accomplished on the order of 20 movements per second.

Prior art vehicles, in an emergency stop, would be caused to lock their brakes. At slow speeds this would at best cause patrons to be jolted in their seats. At higher speeds the locking of brakes induces the vehicle to skid. Furthermore, even if multimedia presentations were synchronized to the position of a vehicle, the skidding of the vehicle would cause all synchronization to be lost. Still further, as the direction and length of a skid would not be know ahead of time, the sudden locking of brakes could cause the vehicle to crash into another vehicle or object. A controlled synchronized emergency stop of an entire ride, however, can prevent skidding and maintain all synchronization of every vehicle with all devices and multimedia in the show.

Figure 3:
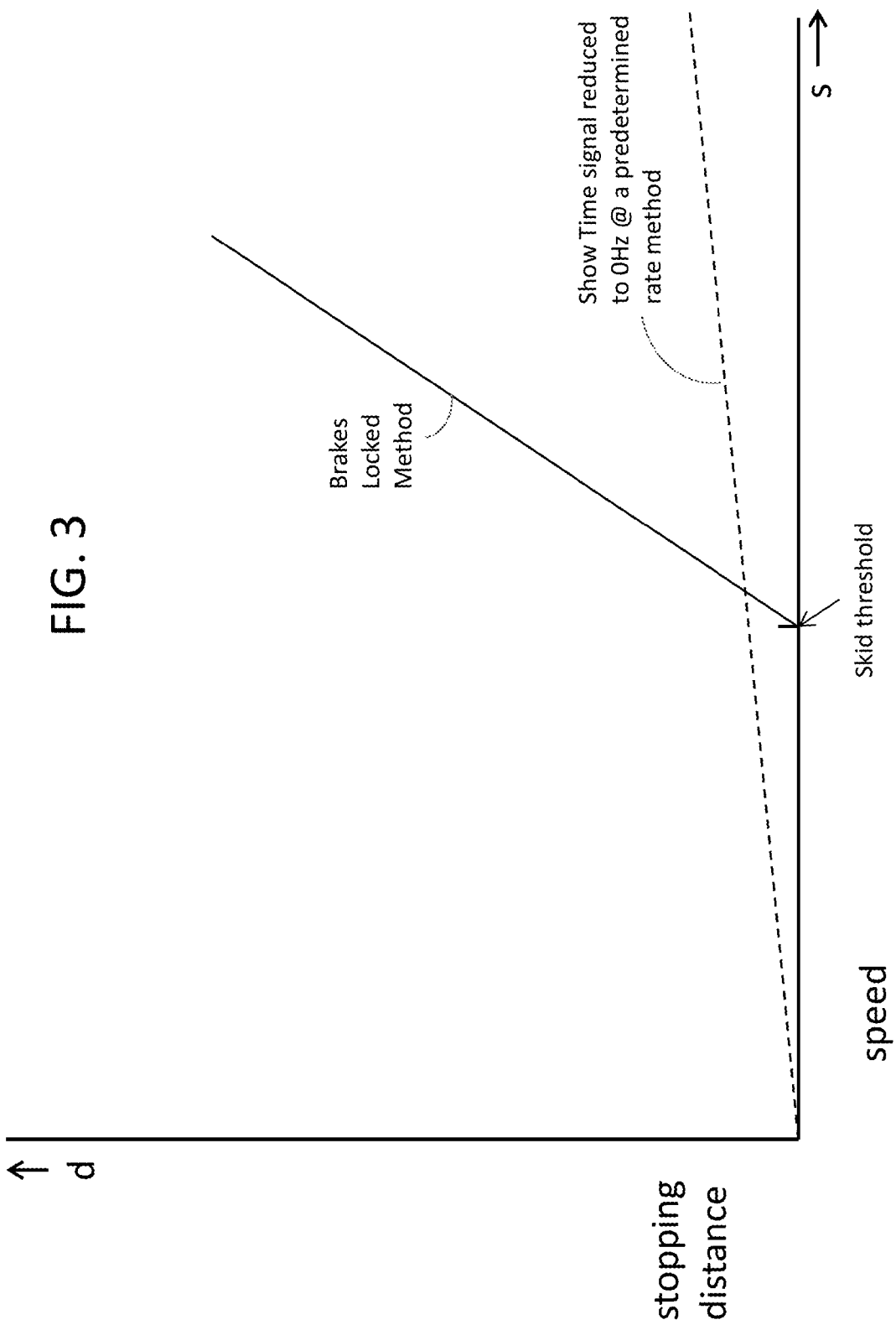
FIG. 3 is a hypothetical comparison of the distance traveled by a vehicle from the initiation of an emergency stop to the cessation of motion across the floor for equal sized and weighted vehicles using the prior art method of locking the brakes versus the method of an embodiment of the invention as described herein.

FIG. 3 is a hypothetical comparison of the distance traveled by a vehicle from the initiation of an emergency stop to the cessation of motion across the floor for equal sized and weighted vehicles using the prior art method of locking the brakes versus the method of an embodiment of the invention as described herein. As shown, at slow speeds, when the locking of brakes does not cause a skid, the prior art method results in zero travel. At a certain threshold speed, however, the vehicle will begin to skid across the floor when the brakes are locked. The length of the skid increases with speed. In contrast, according to a method in accordance with an embodiment of the invention, it is believed that the controlled stop at or above the skidding threshold speed can be accomplished with less travel distance than the prior art method.

Practice of the method in reverse, i.e., un-pausing, allows for the benefit of a controlled return of synchronized motion and multimedia presentations to the entire ride as the rate of the show time clock is increased at a given rate to its normal operational frequency.

Figure 4:
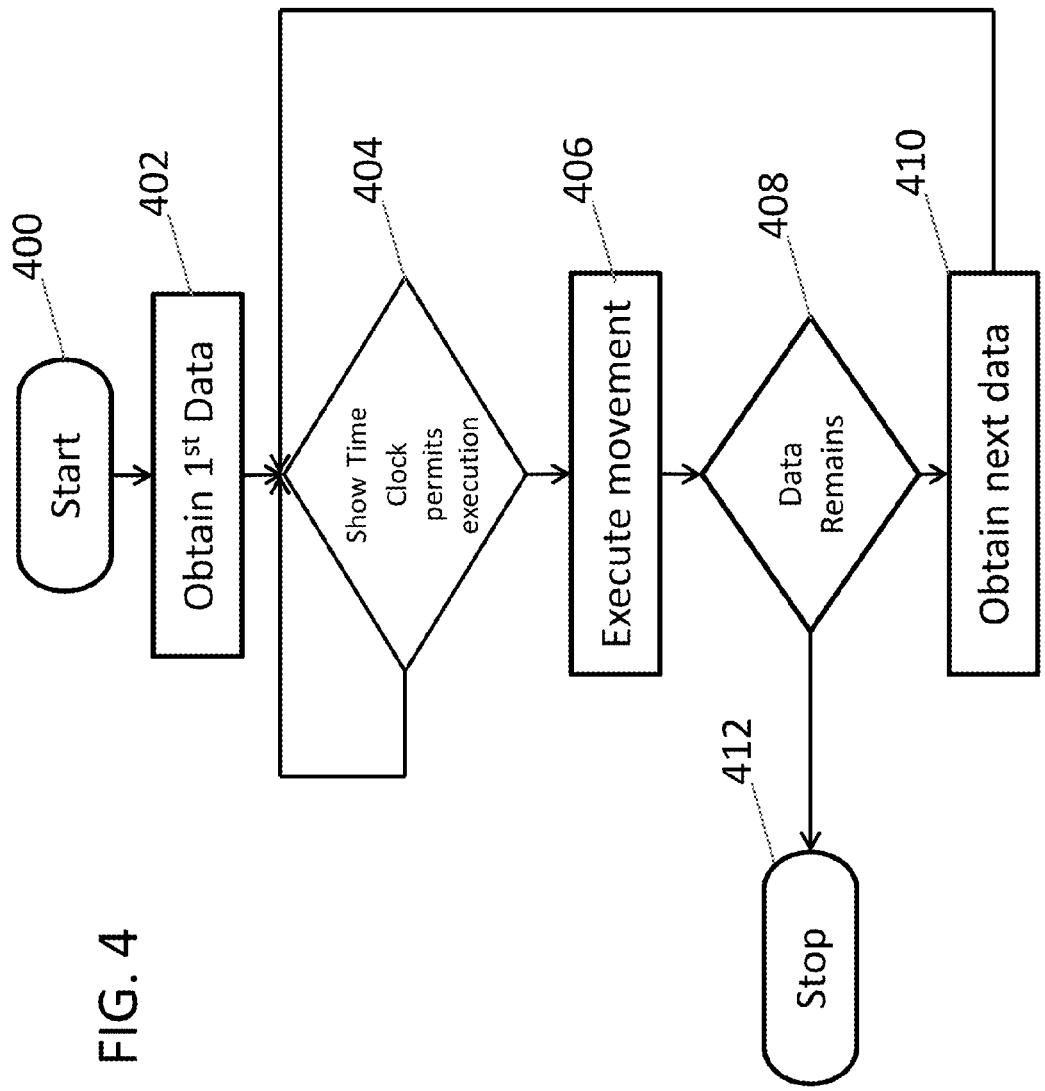
FIG. 4 is a flow diagram of a method in accordance with an embodiment of the invention.

FIG. 4 is a flow diagram of a method in accordance with an embodiment of the invention. The method begins at step 400. At step 402, the first data for the instruction to move a wheel (directionally and rotationally) is obtained. At step 404, a determination is made as to whether the show time clock permits execution of the movement of a wheel. If execution is permitted, at step 406 the processor 10 executes instructions to cause the propulsion and steering drivers to move according to the data. At step 408, it is determined if any movement data remains. If movement data remains, at step 410, the next data in the sequence of data is obtained. The method then returns to step 404. If at step 404 the show time clock does not permit execution of the movement of the wheel, then the method returns to step 404, until the show time clock again permits execution of the movement of the wheel. If at step 408 it is determined that no movement data remains to be executed, the method proceeds to step 412 and stops.

Synchronized control of a plurality of propulsion platforms finds great utility in both indoor and outdoor venues. In the case of an outdoor parade, a ride control system and navigation system can function according to the same or similar rules as used indoors. Self-guided trackless propulsion platforms carrying various ones of payload platforms or motion bases supporting various ones of payload platforms can each execute predefined routes of the parade. If an on-board detection system detects an obstacle in the path of any one of the propulsion platforms, either all of the platforms or the platform that detected the object and all those associated with the platform that detected the object (e.g., in front of or behind it) can be synchronously slowed or stopped to provide time for the obstacle to be removed from the path of the platform. Slowing only a subset of the plurality of platforms is possible by virtue of the individually addressed propulsion platforms. Once the obstacle is cleared, if only a subset of platforms was slowed or stopped, that same subset can be started and sped up so that it returns to the original formation and spacing of the set of parade platforms or of the ride environment in indoor venues. Object detection (i.e., collision avoidance) is more desirable in the outdoor venues. However, in the indoor environment, while object detection may still be practiced, a simpler collision detection system may be alternatively used or used in combination with object detection. This is, in part, because the vehicles (e.g., propulsion platforms) that are used in the indoor environment are equipped with buffers (e.g., bumpers) that protect the vehicles from damage. The collision detection system does just that, indicates when the propulsion platform has collided with another object. While many implementations for such a collision detection system exist, an exemplary implementation would comprise one or more "tape switches" positioned about the vehicle buffer at an optimum height such that when objects collide with the propulsion platform an indication would be generated. A collision detection system may also be used in the outdoor venues.

In yet another embodiment, the show timing signal broadcast by the ride control system 104 is associated with modes or operation of the ride or parade system. An exemplary table of modes is provided below.

TABLE 1

| MODE | Show timing signal frequency | rate of change from base freq |
| --- | --- | --- |
| Normal | Base | n/a |
| Fault 1 | 0 | max |
| Fault 2 | 0 | min |
| Fault 3 | ¼ base | ½ max |
| Test 1 | 2x base | max |
| Test 2 | 3x base | max |
| Test 3 | ½ base to 2x base (variable) | min-max (variable) |

In this embodiment, the show timing signal is based off of an association table similar to Table 1. Such an embodiment can still produce the same results of the earlier described embodiments, except now when a fault condition signal is received it is categorized into the type of fault and therefore the appropriate mode. For example, a signal that would indicate a major error may be categorized, in the example above as a "Fault 1", and would cause the show timing signal (in the form of a broadcasted show time clock or data packets to locally generate a show time clock) to go from a base frequency to 0 at the maximum allowed rate. Other conditions would be associated with different timing modes. Further, such a system would allow synchronization to be kept not just when the ride/parade must be stopped because of an error or fault, but would also allow the system to be run at speeds other than a normal base speed, such as ½ speed, or 2x/3x speed. This mode control may be useful in trouble shooting or re-engineering the system, or alternatively may be used as an actual entertainment attraction. That is, the ride can be advertised and operated at, for example, 2x speed, providing an experience different from normal operation. Such mode control would still change the show timing signal as previously disclosed in order to modify the speed of the propulsion platforms and associated environmental elements (e.g., entertainment devices 114).

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents. For example, one skilled in the art will appreciate that the present invention may be implemented using analog or digital techniques, and through the use of hardware, software, or a combination thereof.

What is claimed is:

1. A system to transport a payload platform along a predefined path, comprising:
 a system controller configured to generate and transmit a variable frequency clock;
 a propulsion platform, supporting the payload platform, configured to traverse the predefined path in synchronism with the variable frequency clock received from the system controller.

2. The system of claim 1, further comprising:
 a plurality of entertainment devices positioned along the predefined path, that operate in synchronism with the variable frequency clock received from the system controller.

3. The system of claim 1, wherein the propulsion platform changes the payload platform's orientation in any one of or in any combination of yaw, sway, and surge.

4. The system of claim 3, further comprising:
 a motion base disposed between the propulsion platform and the payload platform.

5. The system of claim 4, wherein the motion base changes the payload platform's orientation relative to the orientation of the propulsion platform in any one of or in any combination of yaw, roll, pitch, and heave.

6. The system of claim 4, wherein the motion base includes an attachment point to which one of a plurality of payload platforms is removably attached, the one payload platform configured to:
 include a plurality of seats;
 support at least one live action performer;
 support at least one animated three-dimensional figure;
 support at least one three-dimensional representation of scenery; or
 support a three-dimensional representation of mechanical equipment.

7. The system of claim 1, wherein the propulsion platform is a trackless vehicle.

8. The system of claim 1, wherein the propulsion platform further comprises:
 an object detection device configured to detect an object in the propulsion platform's path, and
 a communication device configured to transmit an alert to the system controller.

9. The system of claim 8, wherein the system controller is further configured to initiate a protocol to reduce the speed of the propulsion platform by reducing, according to a predetermined rate of change, the frequency of the variable frequency clock to which the propulsion platform moves in synchronism.

10. The system of claim 1, wherein the propulsion platform includes an attachment point to which one of a plurality of payload platforms is removably attached, the one payload platform configured to:
 include a plurality of seats;
 support at least one live action performer;
 support at least one animated three-dimensional figure;

support at least one three-dimensional representation of scenery; or support a three-dimensional representation of mechanical equipment.

11. The system of claim 1, wherein the variable frequency clock is associated with a mode of operation.

12. The system of claim 1, wherein the propulsion platform is further controlled by event triggers.

13. A system, comprising:
a system controller configured to generate and wirelessly broadcast a plurality of individually addressed variable frequency clocks; and
a plurality of propulsion platforms, each propulsion platform having an address corresponding to at least one of the individually addressed variable frequency clocks;
wherein each propulsion platform supports a corresponding payload platform and is configured to move, along a predefined path, in synchronism with its corresponding one of the plurality of individually addressed variable frequency clocks.

14. The system of claim 13, further comprising:
a plurality of entertainment devices positioned along the predefined path, that operate in synchronism with a corresponding one of the plurality of individually addressed variable frequency clocks received from the system controller.

15. The system of claim 13, wherein each propulsion platform changes its corresponding payload platform's orientation in any one of or in any combination of yaw, sway, and surge.

16. The system of claim 15, further comprising:
a motion base disposed between each propulsion platform and its corresponding payload platform.

17. The system of claim 16, wherein each motion base changes the corresponding payload platform's orientation relative to the orientation of the platform in any one of or in any combination of yaw, roll, pitch, and heave.

18. The system of claim 16, wherein each motion base includes an attachment point to which one of a plurality of payload platforms is removably attached, the one payload platform configured to:

include a plurality of seats;
support at least one live action performer;
support at least one animated three-dimensional figure;
support at least one three-dimensional representation of scenery; or
support a three-dimensional representation of mechanical equipment.

19. The system of claim 13, wherein at least one of the plurality of propulsion platforms is a trackless vehicle.

20. The system of claim 13, wherein at least one of the plurality of propulsion platforms further comprises:
an object detection device configured to detect an object in the at least one of the plurality of propulsion platform's path, and
a communication device configured to transmit an alert to the system controller.

21. The system of claim 20, wherein the system controller is further configured to initiate a protocol to reduce the speed of the plurality of propulsion platforms by reducing, according to a predetermined rate of change, the frequency of each individually addressed variable frequency clock, wherein a synchronized reduction of the frequency causes the plurality of propulsions platforms to slow in synchronism with each other.

22. The system of claim 13, wherein each propulsion platform includes an attachment point to which one of a plurality of payload platforms is removably attached, the one payload platform configured to:
include a plurality of seats;
support at least one live action performer;
support at least one animated three-dimensional figure;
support at least one three-dimensional representation of scenery; or
support a three-dimensional representation of mechanical equipment.

23. The system of claim 13, wherein each propulsion platform is further controlled by event triggers.

* * * * *